(12) United States Patent
Matsuda et al.

(10) Patent No.: US 8,007,564 B2
(45) Date of Patent: Aug. 30, 2011

(54) MANUFACTURE METHOD OF BRIQUETTE FOR USE AS METAL STOCK AND MANUFACTURING APPARATUS THEREOF

(75) Inventors: Mitsuma Matsuda, Kagawa (JP); Toshihide Nakamura, Tenri (JP)

(73) Assignees: Jtekt Corporation, Osaka (JP); Koyo Thermo Systems Co., Ltd., Tenri-Shi (JP)

( * ) Notice: Subject to any disclaimer, the term of this patent is extended or adjusted under 35 U.S.C. 154(b) by 643 days.

(21) Appl. No.: 11/663,168

(22) PCT Filed: Sep. 28, 2005

(86) PCT No.: PCT/JP2005/017859
§ 371 (c)(1),
(2), (4) Date: Mar. 19, 2007

(87) PCT Pub. No.: WO2006/035818
PCT Pub. Date: Apr. 6, 2006

(65) Prior Publication Data
US 2008/0000328 A1    Jan. 3, 2008

(30) Foreign Application Priority Data
Sep. 28, 2004  (JP) .................................. 2004-281889

(51) Int. Cl.
*C22B 1/14* (2006.01)
(52) U.S. Cl. .......................................... 75/770; 75/746
(58) Field of Classification Search .................. 75/255, 75/252, 253, 254, 746–773, 300–329, 228–250; 148/513, 516; 419/2, 61–69; 266/249–264, 266/138–141; *F26B 15/00*
See application file for complete search history.

(56) References Cited

U.S. PATENT DOCUMENTS

| | | | | |
|---|---|---|---|---|
| 1,415,094 A | * | 5/1922 | Jones | 75/311 |
| 1,701,873 A | * | 2/1929 | Crossman | 34/174 |
| 1,782,244 A | * | 11/1930 | Nagel | 34/171 |
| 2,858,795 A | * | 11/1958 | Walker | 118/50 |
| 4,518,432 A | | 5/1985 | Hess et al. | |
| 7,591,877 B2 | * | 9/2009 | Matsuda | 75/770 |
| 2002/0152843 A1 | | 10/2002 | Ishihara et al. | |
| 2003/0075014 A1 | | 4/2003 | Ishihara et al. | |

FOREIGN PATENT DOCUMENTS

DE  22 37 149 A1  2/1973
(Continued)

OTHER PUBLICATIONS

JP 11-269564: English abstract and machine translation obtained on Sep. 14, 2009. Japanese language version published Oct. 5, 1999.*

*Primary Examiner* — Scott Kastler
*Assistant Examiner* — Vanessa Velasquez
(74) *Attorney, Agent, or Firm* — Birch, Stewart, Kolasch & Birch, LLP (57) ABSTRACT

A manufacture method of briquette for use as metal stock is provided which increases the efficiency of drying porous masses so as to shorten a drying time, and which provides a simplified constitution for reducing an installation area of a system and for reducing the running cost and initial cost of the system. The porous masses are formed by compression molding a recyclable material containing metallic powder. The compression molded porous masses are fed into a tubular member, into which hot air is blown for drying the porous masses.

5 Claims, 8 Drawing Sheets

FOREIGN PATENT DOCUMENTS

| | | |
|---|---|---|
| DE | 21 51 819 B1 | 5/1973 |
| EP | 1 323 838 A1 | 7/2003 |
| JP | 11-269564 A | 10/1999 |
| JP | 2002-129248 A | 5/2002 |
| JP | 2003-277842 A | 10/2003 |
| WO | WO-02/14564 A1 | 2/2002 |

* cited by examiner

MANUFACTURE METHOD OF BRIQUETTE FOR USE AS METAL STOCK AND MANUFACTURING APPARATUS THEREOF

TECHNICAL FIELD

The present invention relates to a manufacture method of briquette for use as metal stock and a manufacturing apparatus thereof. Particularly, the invention relates to a method of forming a briquette from a recyclable material containing metallic powder such as grinding dust and a manufacturing apparatus for performing the method.

BACKGROUND ART

Grinding dust resulting from grinding a ferrous metal such as bearing steel or carburized steel is collected in the form of cotton-like (fibrous) agglomerates including: a grinding fluid containing water and oil; abrasive grains and the like. Since the cotton-like agglomerates contain a large quantity of pure iron, a technique for reusing the agglomerates as a steelmaking material has been proposed. Japanese Unexamined Patent Publications No. 2002-129248 and No. 2003-277842, for example, disclose the following technique. According to the method, a briquette for use as a steelmaking material is formed by the steps of: forming a porous mass (a brittle compact) by compression molding the cotton-like agglomerates using a press, the agglomerates having adjusted contents of water and oil; impregnating a solidification agent into the porous mass by dipping the porous mass in an aqueous solution of the solidification agent; and subjecting the porous mass to natural drying (curing).

A batch type and a belt conveyor type are conventionally known as drying equipment for drying the porous mass impregnated with the solidification agent. The batch type equipment is arranged such that a plurality of porous masses is collectively accommodated in a drying furnace. The belt-conveyor type equipment is arranged such that a conveyor is installed in a furnace and the porous masses are dried while the porous masses are carried on the conveyor.

Since the above method of manufacturing the briquettes by natural drying requires an extremely long drying time, an approach has been made to dry the briquettes quickly by using the drying furnace. However, the porous masses formed by compression molding are significantly varied in bulk density. When the masses are dipped in the aqueous solution of solidification agent, therefore, the amounts of water contained in the porous masses are also varied greatly. If the bulk densities of the porous masses vary in the range of 1.5 to 3.5, for example, the moisture content of the porous masses impregnated with the solidification agent vary in the range of 20 to 200 cc. When the porous masses are dried by means of the batch type or the belt-conveyor type drying furnace, the drying time must be set according to a porous mass having the greatest moisture content.

In case where the batch type furnace is used, the degree of drying varies between a surface portion and a core portion of a porous mass. Hence the porous mass is overdried at the surface portion before the porous mass is dried to the core portion. The porous mass generates heat due to iron oxidization, causing troubles such as ignition and strong odors. Furthermore, there is another drawback of great energy loss. In addition, the batch type furnace requires manual labor leading to a low operating efficiency and also takes a substantial length of drying time (e.g., 10 to 20 hours).

In a case where the belt-conveyor type furnace is used, the furnace has large dimensions in order to permit the conveyor to be installed therein and hence, is low in thermal efficiency (suffers a great energy loss). This results in a drawback of low drying efficiency. Furthermore, a detention time of 3 to 6 hours is necessary for the drying furnace to dry the porous masses. This requires a furnace equipped with an extremely long conveyor, so that the equipment is increased in length and installation area (foot-print).

In view of the foregoing, it is an object of the present invention to provide a manufacture method of briquette for use as metal stock and a manufacturing apparatus therefor, the manufacture method which increases the efficiency of drying the porous masses so as to shorten the drying time, and which provides a simplified constitution for reducing the installation area of the apparatus and for reducing the running cost and initial cost therefor.

DISCLOSURE OF THE INVENTION

According to the invention for achieving the above object, a manufacture method of briquette for use as metal stock comprises: a molding step of forming a porous mass by compression molding a recyclable material containing metallic powder; and a drying step of feeding the compression molded porous mass into a tubular member and blowing hot air into the tubular member thereby drying the porous mass.

The briquette manufacture method of such composition enables quick drying of the porous masses because the porous masses are forcedly dried by means of the hot air through the tubular member. Moreover, the porous masses can be efficiently made in contact with the hot air because the drying process is carried out in a limited space in the tubular member. Thus, the drying time can be shortened and an increased drying efficiency can be achieved. In addition, the hot air generator can be reduced in capacity.

It is preferred that the manufacture method further comprises an impregnating step of dipping the porous mass in a solidification agent prior to the drying step, thereby impregnating the solidification agent into the porous mass. Thus is obtained a briquette having a high mechanical strength and featuring easy handlings such as transportation and storage.

It is further preferred in the impregnating step that the porous mass is dipped in the solidification agent heated to a temperature higher than that of the compression molded porous mass. Thus, the just-molded porous mass is heated so that the temperature of the porous mass can be quickly raised to a desired drying temperature in the drying step. Accordingly, the drying time can be decreased effectively.

It is also preferred in the drying step that a plurality of porous masses sequentially fed into the tubular member is dried as they are transported in a row along a longitudinal direction of the tubular member. Accordingly, the length of the equipment can be reduced, while on the other hand, the porous masses can be uniformly dried in sequence. This ensures the manufacture of briquettes having a consistent quality.

It is further preferred that an interspace portion extending in the longitudinal direction of the tubular member is defined between an inside surface of the tubular member and outside surfaces of a plurality of porous masses fed into the tubular member and arranged in a row, and that the porous masses are dried by smoothly passing the hot air through the interspace portion substantially over the entire length of the interspace portion. This enables an adequate forced drying with the hot air, and hence the porous masses can be dried quickly.

According to the invention for achieving the above object, a manufacturing apparatus for briquette for use as metal stock comprises: a tubular member accommodating a plurality of porous masses formed by compression molding a recyclable material containing metallic powder and arranged in a row; and a hot air generator for blowing hot air into the tubular member through an inlet port provided at the tubular member; wherein an interspace portion for smoothly passing the hot air from the hot air generator is defined between an inside surface of the tubular member and outside surfaces of a plurality of porous masses accommodated in the tubular member and extended in a longitudinal direction of the tubular member.

Such a briquette manufacturing apparatus enables to provide the forced drying with the hot air so as to dry the porous masses quickly. Furthermore, the drying process is carried out in the limited space portion in the tubular member so that the porous masses can be efficiently exposed to the hot air. This results in the reduction of the drying time and the enhanced drying efficiency. What is more, the equipment is simplified, which leads to the reduction of equipment cost as well as installation area (foot-print) of the equipment.

It is further preferred that pusher transporting means is disposed outwardly of an upstream end of the tubular member, the means operating to feed in sequence the porous masses into the tubular member by pushing each of the porous masses from the upstream end side and to transport a row of the porous-masses by pushing the preceding porous masses via the porous mass being fed, that the inlet port of the tubular member is disposed on a downstream end side of the tubular member, and that the hot air from the hot air generator is made to flow from the downstream side toward the upstream side of the tubular member. This composition eliminates the need for providing conventional transporting means, such as a belt conveyor, in the tubular member. Hence the tubular member constituting the drying furnace can be downsized. Furthermore, the apparatus can dry the porous masses quickly.

It is also preferred that a cross section of the interspace portion is defined to be 20% to 50% of the overall cross section of an interior of the tubular member. This constitution permits the hot air to smoothly flow through the interspace portion in the tubular member over the entire length thereof. Furthermore, the constitution obviates a problem that the interspace portion is so large that the hot air flows at a region remote from the porous masses. Hence, the energy loss can be reduced. In addition, the constitution expedites the increase of flow velocity of the hot air so as to increase heat transfer rate and achieve an increased drying efficiency.

BEST MODE FOR CARRYING OUT THE INVENTION

A preferred embodiment of the invention will hereinbelow be described with reference to the accompanying drawings.

Figure 1:
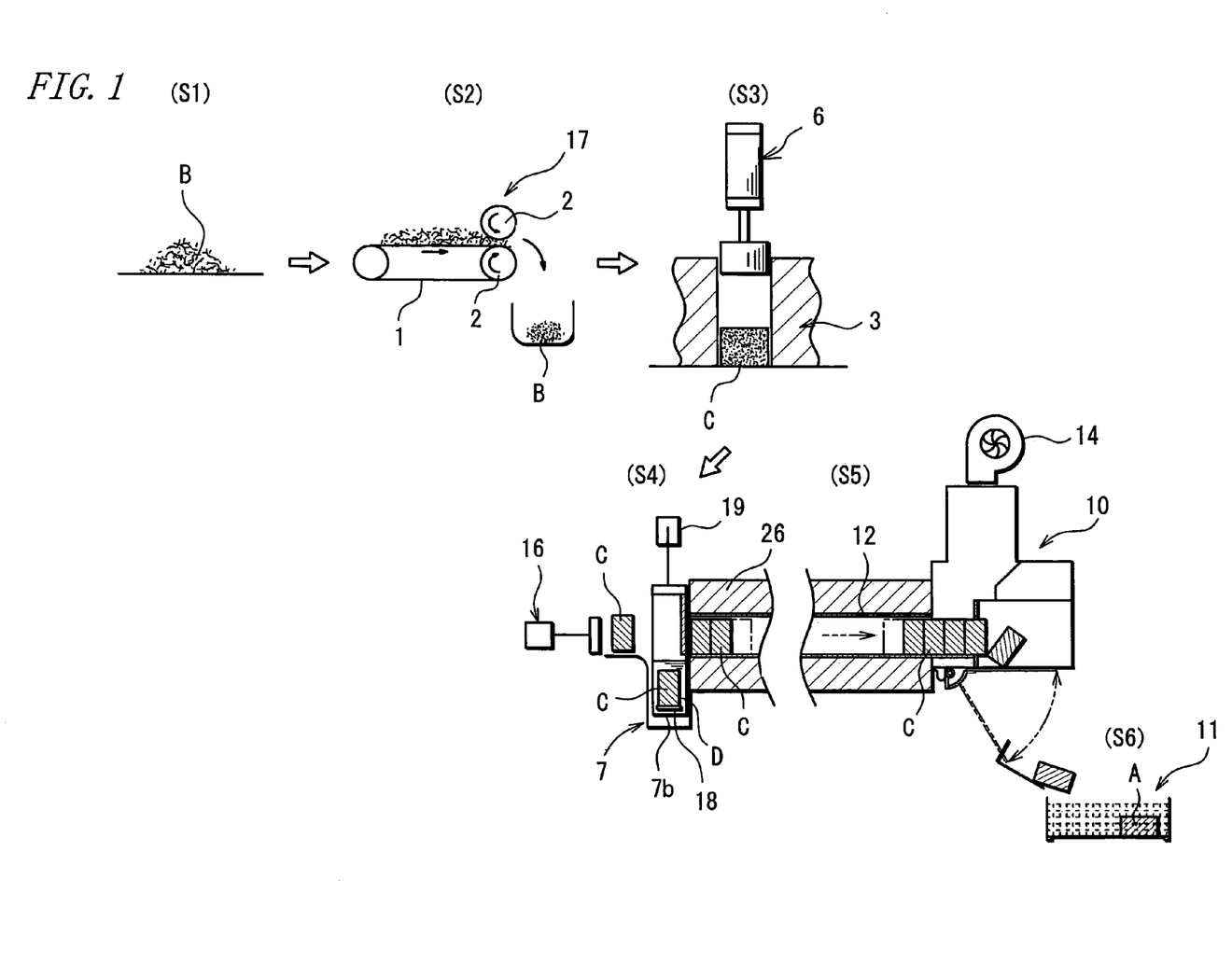
FIG. 1 is process diagram illustrating a manufacture method of briquette for use as metal stock according to one embodiment of the invention.

FIG. 1 is a process diagram illustrating a manufacture method of briquette for use as metal stock according to one embodiment of the invention. In the manufacture of a briquette A, cotton-like agglomerates B (S1 in FIG. 1) of grinding dust (a recyclable material containing metallic powder) resulting from a grinding process of a ferrous metal, such as bearing steel, hardened by heat treatment is first compressed under pressure application for preliminarily adjusting the contents of water and oil from grinding fluid in the cotton-like agglomerates B. The compression of the cotton-like agglomerates B under pressure is carried out by means of a compressing machine 17 included in a briquette manufacturing apparatus. For example, the compressing machine 17 includes a belt conveyor 1 and a pair of rolls 2, and compresses the cotton-like agglomerates B by clamping the agglomerates between the roll pair 2 as the compressing machine 17 is carrying the agglomerates on the belt conveyor 1 (S2 in FIG. 1).

Next, a press 6 is operated for compression molding in a mold 3 the cotton-like agglomerates B having the adjusted contents of water and oil, thereby forming a porous mass (brittle compact) C having a bulk density of 1.5 to 3.5 (molding step: S3 in FIG. 1). The compression molding roughly shears the grinding dust having a spiral-fiber shape and included in the cotton-like agglomerates B, and also removes excessive water and oil from the agglomerates. In addition, the compression molding raises the temperature of the porous mass C to a level 30 to 50° C. higher than a pre-molding temperature of the cotton-like agglomerates B. The porous mass C is molded into a shape easy to handle, such as column, sphere, or prism, and is compacted to such a strength as not to collapse during transportation or the like.

Prior to a drying step, the porous mass C is subjected to an impregnating step wherein the porous mass C is dipped in a solidification agent D so as to be impregnated with the solidification agent D. This impregnating step is performed immediately after the molding step is completed (impregnating step: S4 in FIG. 1).

The impregnation of the solidification agent D is performed, for example, by means of a dipping machine 7 which includes a tank 7b storing therein an aqueous solution containing the solidification agent D, a retaining member 18 on which the porous mass C is placed, an actuator (hydraulic cylinder) 19 for moving up or down the retaining member 18. Specifically, the porous mass C discharged from the press 6 is retained by the retaining member 18 at an elevated position (placed on the retaining member 18). The retaining member 18 is lowered by the actuator 19 so as to dip the porous mass C in the solidification agent D in the tank 7b for a predetermined length of time. Subsequently, the retaining member 18 is elevated to supply the porous mass C to a drying apparatus 10 to be described hereinafter.

While the aqueous solution containing the solidification agent D may be at ambient temperature, it may preferably be heated by a heater to temperatures higher than that of the porous mass C right after molded. In this case, the heater is disposed in the tank 7b. Specifically, the aqueous solution containing the solidification agent D may be heated to 80 to 90° C.

According to this method, the just-molded porous mass C is heated and quickly fed to the drying step, in which the temperature of the porous mass C can be quickly raised to a desired drying temperature. Thus, the drying time can be shortened effectively. In a case where a porous mass C having a diameter of 60 to 70 mm and a length of 40 to 50 mm is dipped in the aqueous solution containing the solidification agent D at normal temperatures, the conventional manufacture method normally requires a drying time of 8 to 16 hours. In contrast, a drying time of 1 hour or less is sufficient for the manufacture method and manufacturing apparatus of the invention. This results in a notable reduction of energy used for the drying purpose.

The porous mass C is dipped in the aqueous solution of the solidification agent D for 15 to 180 seconds. The dipping time is much shorter than a conventional dipping time (15 minutes or more). Thus, the amount of solidification agent D impregnated into the porous mass C is reduced so as to reduce the moisture content of the porous mass C. That is, the moisture content of the porous mass C is reduced by dipping the porous mass C in the aqueous solution containing the solidification agent D for a decreased length of time, whereby the drying time for the porous mass C can be shortened effectively.

The solidification agent D may preferably contain at least one type selected from the group consisting of colloidal silica, sodium silicate, and aluminum phosphate. This provides for an easy and rigid solidification of the porous mass C.

Next, the porous mass C which has completed the impregnating step is immediately fed into (charged in) a tubular member 12 of the drying apparatus 10. Hot air is blown into the tubular member 12 so as to dry the porous mass C in the tubular member 12 (drying step: S5 in FIG. 1). The porous mass C is fed into the tubular member 12 by means of pusher transporting means 16 shown in FIG. 2. Specifically, a head portion of the actuator 19 of the dipping machine 7 is elevated so that the porous mass C dipped in the aqueous solution containing the solidification agent D as while it is retained by the retaining member 18 is moved up from within the tank 7b to a feeding start position corresponding to an end of an upstream opening of the tubular member 12. A head portion 20 of the pusher transporting means 16 disposed at place further upstream from the dipping machine 7 (outwardly of the upstream end of the tubular member 12) performs a push-in motion. Thus, the porous mass C retained by the retaining member 18 of the dipping machine 7 is pushed off the retaining member 18 and fed into the tubular member 12. The pusher transporting means 16 may be, for example, a hydraulic cylinder.

Figure 2:
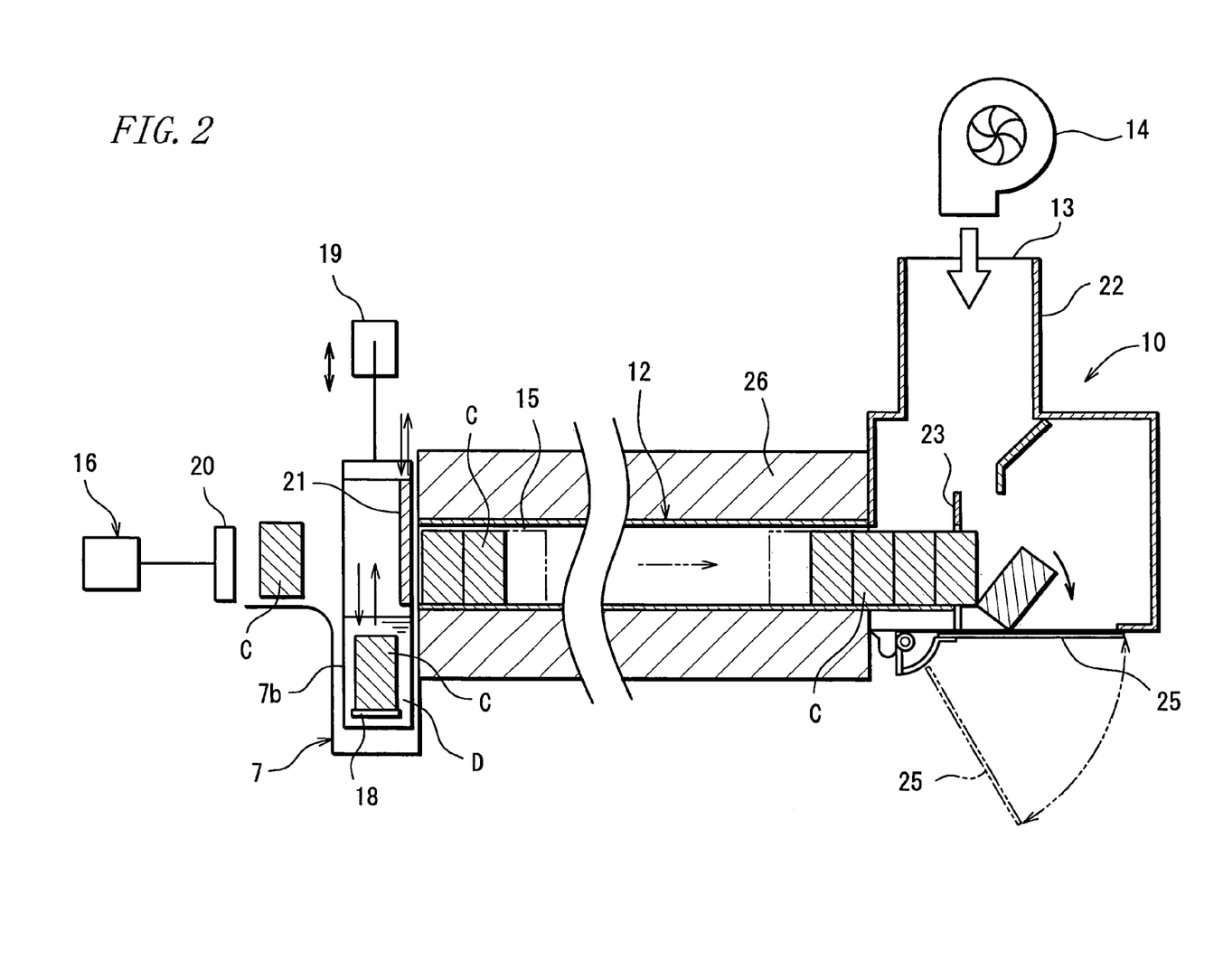
FIG. 2 is a sectional side view showing pusher transporting means, a dipping machine and a drying apparatus.

Disposed between the feeding start position equivalent to an elevated position of the porous mass C and the end of the upstream opening (inlet port) of the tubular member 12 is a shutter member 21 to prevent an excessive escape of the hot air for drying from occurring. The shutter member 21 is disposed in such a manner as to close the end of the upstream opening of the tubular member 12 with a gap therebetween. The shutter member 21 is designed to move up or down in conjunction with the movement of the retaining member 18 of the dipping machine 7. In conjunction with the elevation of the porous mass C, the shutter member 21 is also moved up to allow the porous mass C to be fed into the tubular member 12 of the drying apparatus 10.

The drying apparatus 10 includes: the horizontal tubular member 12 for accommodating a plurality of porous masses C so fed and arranged in a row and for drying the porous masses; and a hot air generator (blower) 14 for blowing the hot air into the tubular member 12 from an inlet aperture 13 provided at the tubular member 12. An interspace portion 15 extending in a longitudinal direction of the tubular member 12 is defined between an inside surface of the tubular member 12 and outside surfaces of a plurality of porous masses C fed into the tubular member 12. The hot air is smoothly passed through the interspace portion 15 substantially over the entire length thereof, thereby drying the porous masses C.

The pusher transporting means 16 sequentially feeds the porous masses C into the tubular member 12 by pushing each of the porous masses from the upstream end side of the tubular member. A constitution is made such that the pusher transporting means 16 further pushes the preceding porous mass C which is fed into the tubular member 12 via the porous mass C being pushed, thereby transporting a row of porous masses C through the tubular member 12. That is, the porous masses C fed into the tubular member 12 and adjoining each other are in contact with each other. The row of a plurality of porous masses C is intermittently moved from the upstream end side of the tubular member 12 when they are pushed by the pusher transporting means 16.

The inlet aperture 13 of the tubular member 12 is disposed at place on a downstream end side of the tubular member 12 and is constituted by a short cylinder member 22 having an axis orthogonal to an axis of the tubular member 12. The hot air from the hot air generator 14 is supplied into the tubular member 12 through the short cylinder member 22 and is made to flow from the downstream side toward the upstream side of the tubular member 12. A downstream end of the tubular member 12 is closed, so that the hot air supplied from the downstream side of the tubular member 12 flows through the interspace portion 15 toward the upstream side. In a case where the hot air flown through the tubular member 12 and discharged therefrom has a higher temperature than that of the solution in the tank 7b of the dipping machine 7, the energy of the discharged hot air may be utilized for heating the aqueous solution of the solidification agent D in the tank 7b.

The term "upstream side" as used herein is defined to mean a side from which the porous masse C is fed into the tubular member 12 (the pusher transporting means-16 side), whereas the term "downstream side" as used herein is defined to mean a side from which the porous mass C is discharged.

It is preferred to define a cross section of the interspace portion 15 to be 20% to 50% of the overall cross section of an interior of the tubular member 12. If the cross section is less than 20%, the interspace portion 15 is too small in the cross section and the passage of the hot air may be obstructed. If the cross section exceeds 50%, an increased amount of the hot air passes through an area remote from the porous masses C, resulting in an increased energy loss.

Figure 4:
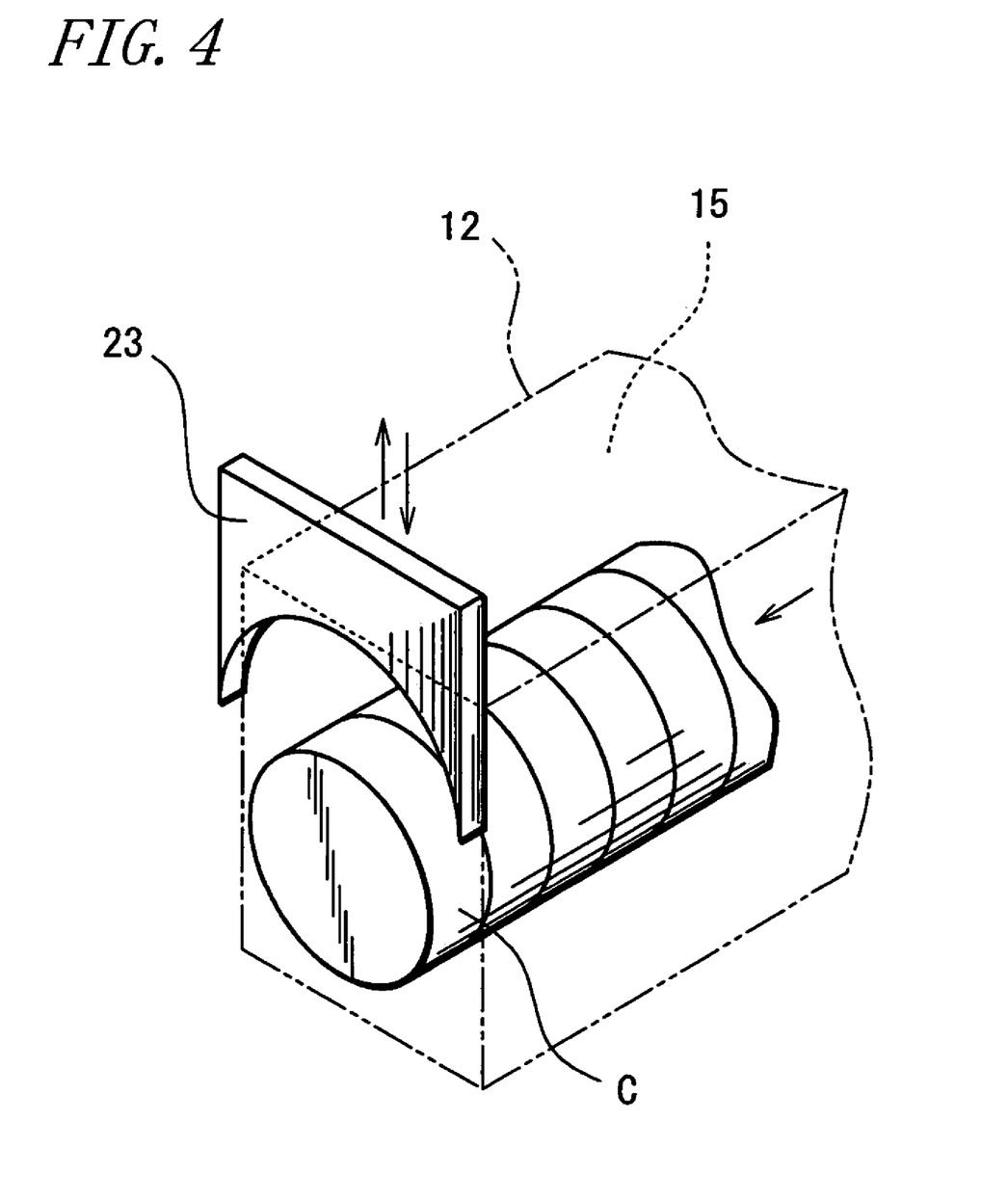
FIG. 4 is a perspective view explaining an air volume control member.

While the hot air discharged from the hot air generator 14 may be controlled to a constant volume, the tubular member 12 is provided with an air-volume controlling member 23 on the downstream side thereof to control the volume of the hot air passing through the interspace portion 15, as shown in FIG. 2 and FIG. 4. The air-volume controlling member 23 may be constituted by, for example, a plate member partially blocking the section of the interspace portion 15 (cross section of the hot air passage). The air-volume controlling member 23 can be moved up or down for varying the blocking area (throttling the cross section of the hot air passage) thereby controlling the volume of the hot air outputted from the hot air generator 14 and passing through the interspace portion 15.

Figure 3:
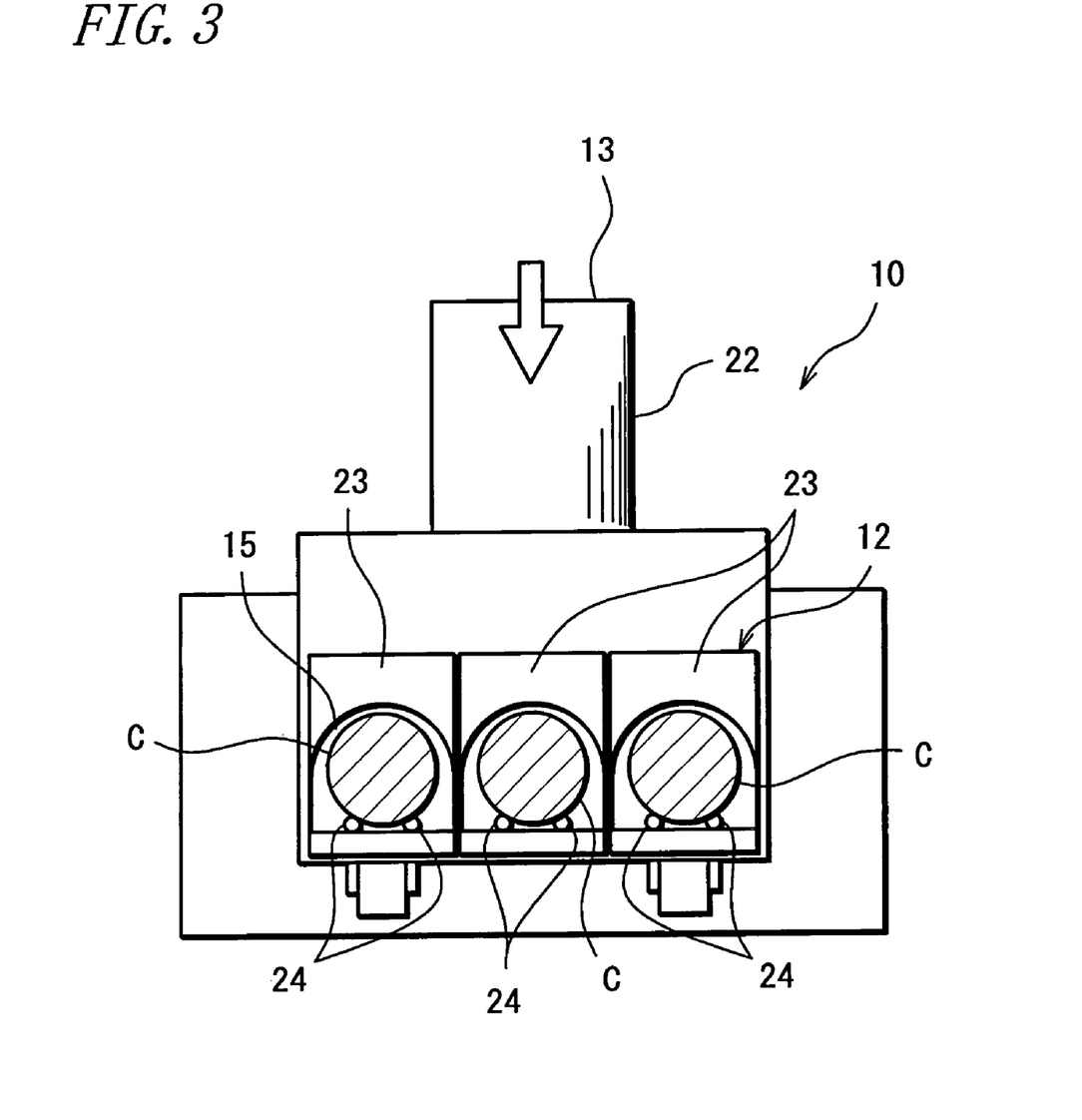
FIG. 3 is a sectional view of a tubular member of the drying apparatus as seen from a downstream side.

As shown in FIG. 3, the porous masses C in the tubular member 12 are placed on two rail members 24 laid on an inside surface of a bottom wall of the tubular member 12 and transported while it is linearly guided. Thus is provided a smooth transportation of the porous masses C, while the individual porous masses C can be exposed to the hot air at their overall peripheries except for their (linear) contact portions with the rail members 24.

The porous mass C so dried while it is transported through the tubular member 12 is pushed out by the adjoining upstream porous mass C driven by the action of the pusher transporting means 16. When the porous mass C comes off the guiding rail members 24 (on the bottom wall of the tubular member 12), it is released from the tubular member 12 by free-fall and is delivered into a product collecting box 11 through a workpiece exit port and a shooter (S6 in FIG. 1). Thus is obtained the briquette A for use as metal stock.

As shown in FIG. 2, the tubular member 12 includes an openable cover member 25 which is disposed at the workpiece exit port and automatically opened by the weight of the porous mass C fallen thereon when it comes off the guide (the rail members 24), thereby discharging the porous mass C. The openable cover member 25 is provided with an elastic member (spring) so as to hold the workpiece exit port in a closed position when no porous mass C falls onto the cover member. Thus, the cover member 25 serves to prevent the escape of the hot air to the outside except for the time to allow the porous mass C to be discharged.

The tubular member 12 is further provided with a heat insulating member 26 on an outer periphery thereof. Examples of a usable material for the heat insulating member 26 include metallic wool, silica board, a combination thereof and the like. The heat insulating member 26 may have a thickness of 50 mm to 100 mm.

As shown in FIG. 3, the tubular member 12 may also have a rectangular sectional shape. The tubular member 12 may also have a constitution wherein the porous masses C are transported through the tubular member 12 as arranged in a plurality of rows (three rows as shown in FIG. 3).

The tubular member 12 having the rectangular sectional shape can be designed to permit an upper wall thereof to be opened or closed. This facilitates a maintenance task for inside the tubular member 12.

Figure 5:
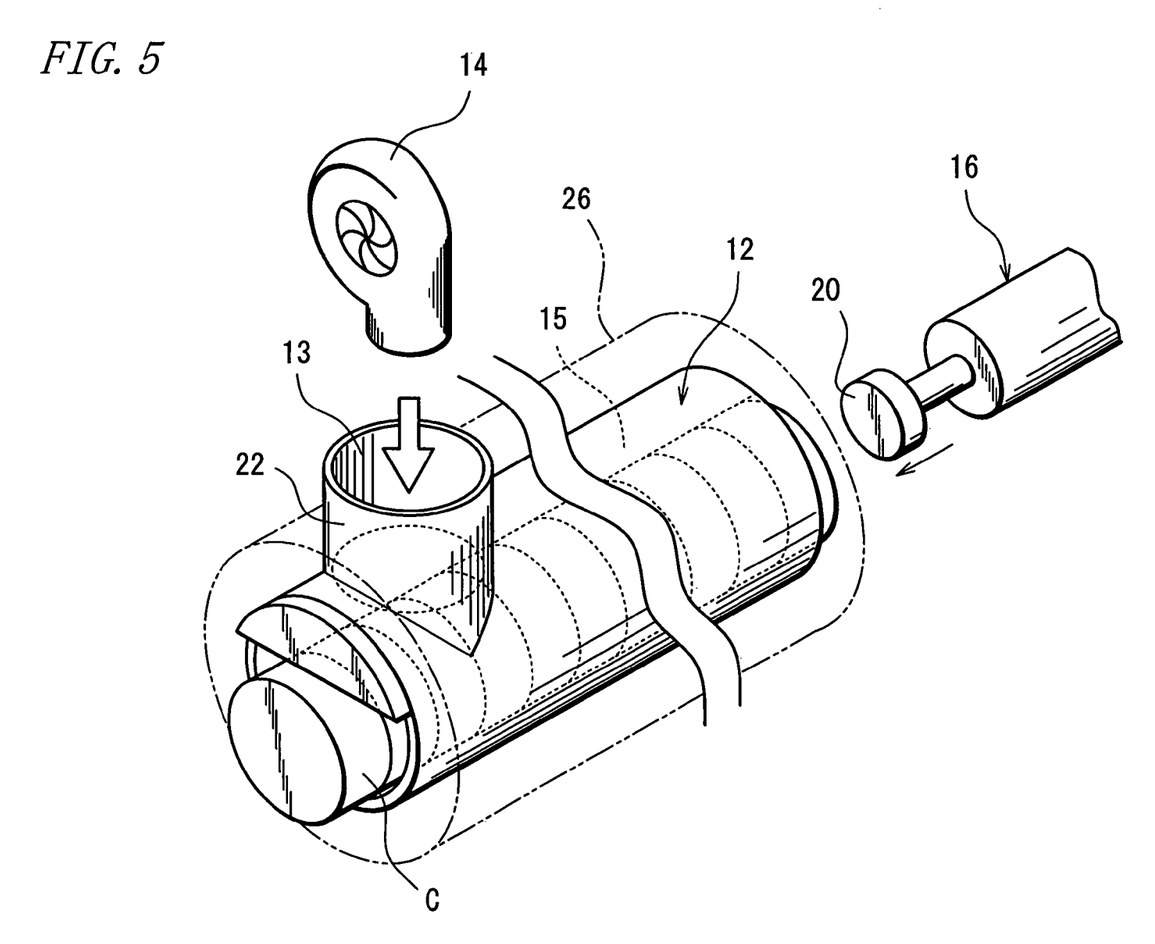
FIG. 5 is a perspective view showing an exemplary modification of the tubular member.
Figure 6:
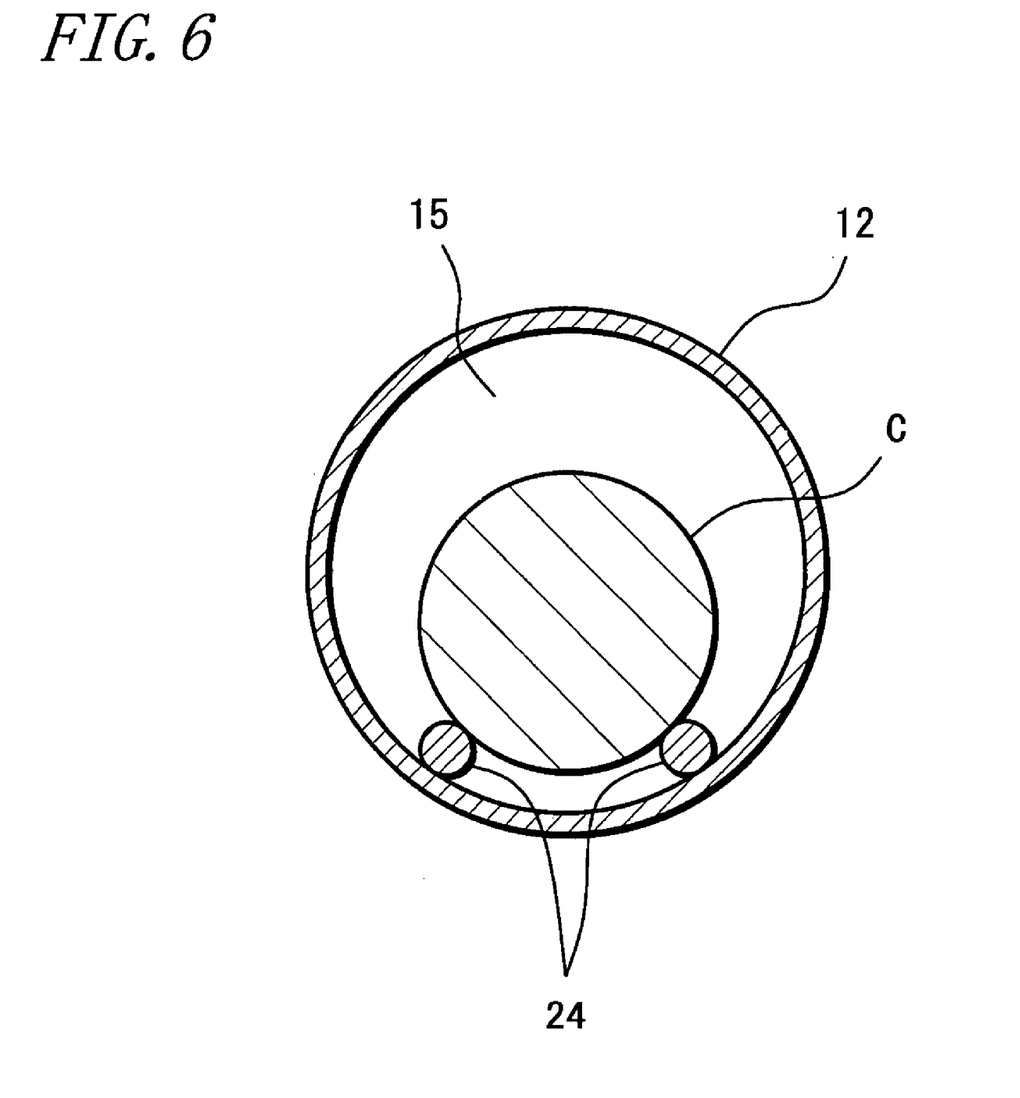
FIG. 6 is a cross sectional view showing the tubular member of FIG. 5.

FIG. 5 and FIG. 6 are a perspective view showing an exemplary modification of the drying apparatus 10 and a sectional front view showing the tubular member 12 shaped like a circular tube. Specifically, the tubular member 12 has a cross-sectional shape which is similar to a cross-sectional shape of the porous mass C shaped like a circular cylinder, thereby defining the interspace portion 15 configured in conformity with an outside configuration of the porous mass C for effective exposure of the porous mass C to the hot air. In this case, the tubular member 12 may have a diameter of, for example, $\phi$70 mm to $\phi$90 mm, provided that the diameter of the workpiece (porous mass) is in the range of $\phi$50 mm to $\phi$65 mm.

Figure 7:
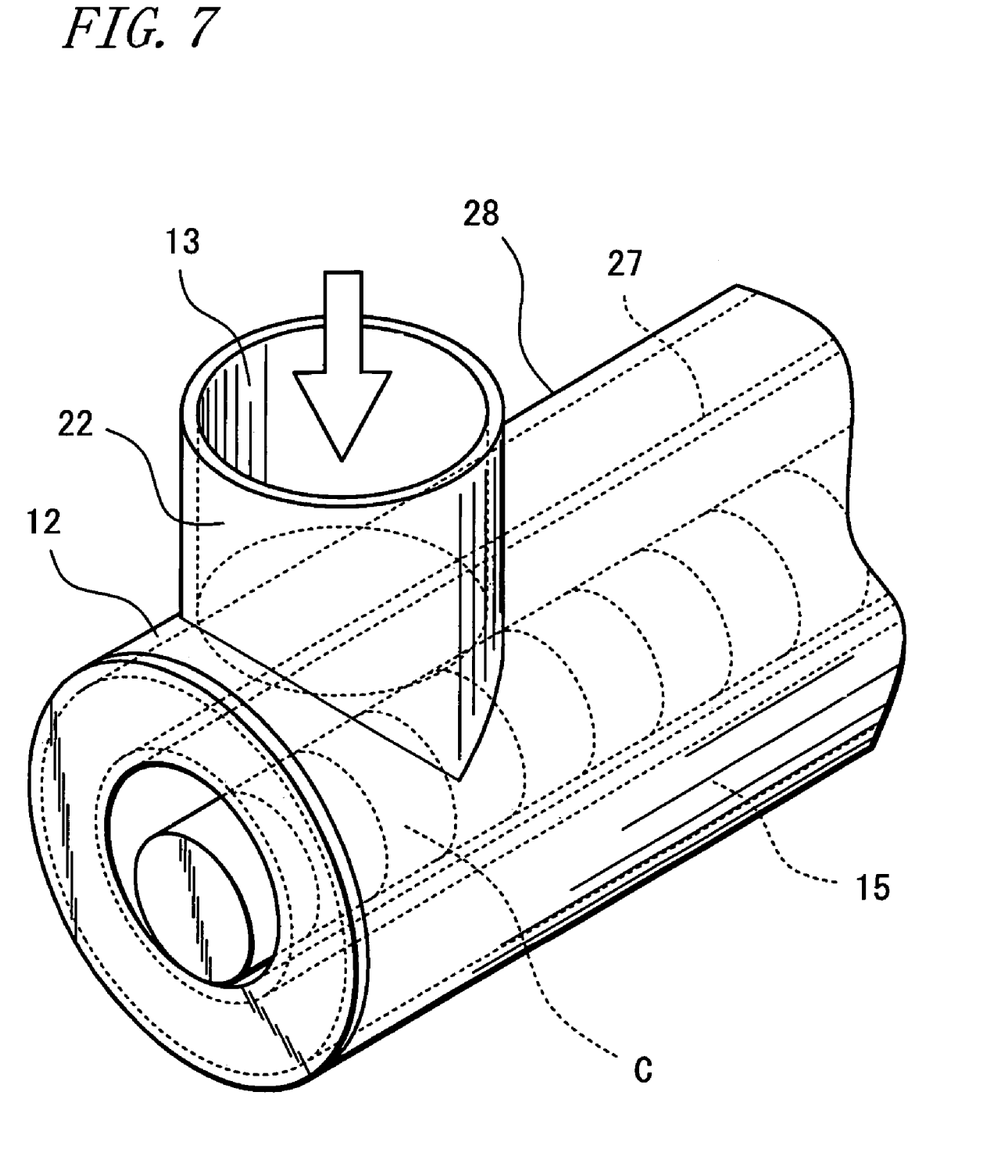
FIG. 7 is a perspective view showing another exemplary modification of the tubular member.
Figure 8:
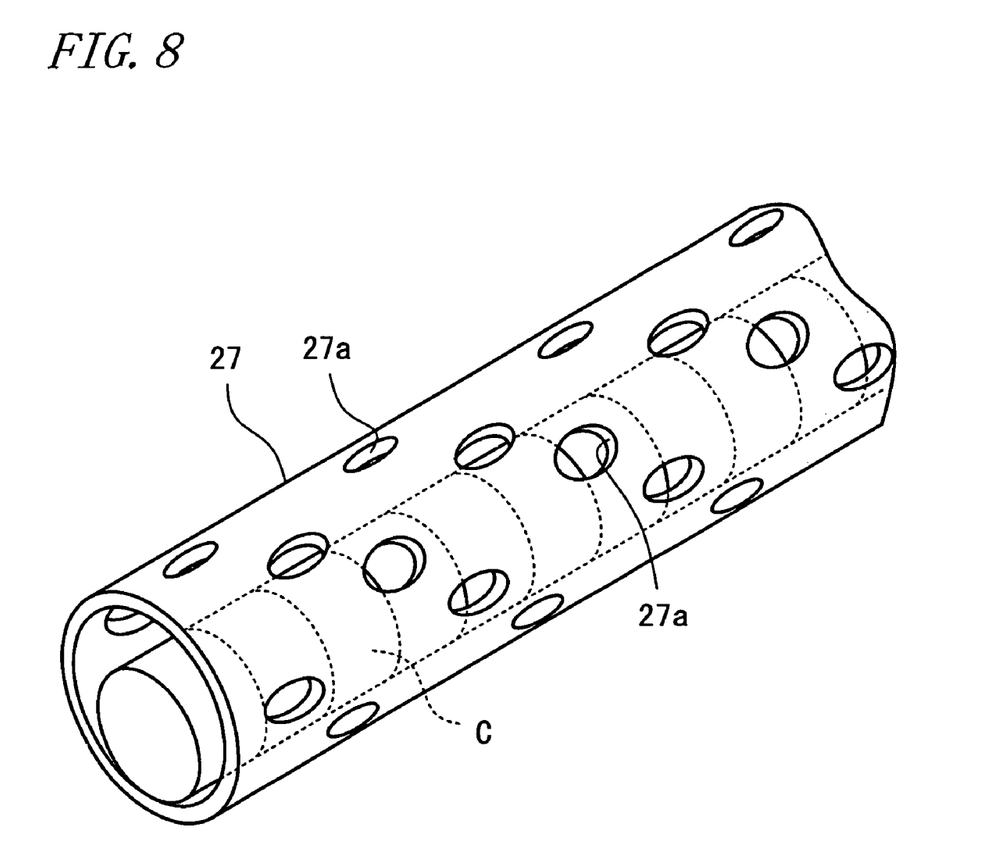
FIG. 8 is a perspective view showing an internal tube.

FIG. 7 shows another exemplary modification of the drying apparatus 10. The tubular member 12 of this apparatus has a dual-tube structure including an inner tube 27 and an outer tube 28. The outer tube 28 has opposite ends closed except for central portions thereof where the inner tube 27 is disposed. The outer tube 28 is provided with the short cylinder member 22 on the downstream end side thereof, the short cylinder member 22 formed with the inlet aperture 13. The inner tube member 27 is a tube member with holes disposed centrally of the outer tube 28. FIG. 8 is a perspective view showing the internal tube 27. The hot air is blown into the outer tube 28 from the inlet aperture 13 and passes through holes 27a of the inner tube 27 for air-drying the porous masses C in the inner tube 27. The hot air escapes from an end of the inner tube 27. The inner tube 27 is also adapted to function as the transportation guide for the porous masses C.

Next, description is made on the drying step of drying the porous masses C, the drying step performed by the above drying apparatus 10 according to the embodiment. The tubular member 12 may have a length of 1400 mm to 1700 mm. For example, in a case where the tubular member has a length of 1500 mm, when the porous mass C has an axial dimension (axial length) of 45 mm, and when the pusher transporting means 16 feeds the porous mass C into the tubular member 12 at a feeding cycle of 90 seconds, then the tubular member 12 accommodates 33 porous masses C therein so that a drying time in the tubular member 12 is figured out to be about 50 minutes. It is noted that the porous mass C is dipped in the aqueous solution containing the solidification agent D at normal temperatures for 30 seconds in the impregnating step, before fed into the tubular member 12. This 30-second impregnating step is performed during the feeding cycle of 90 seconds. That is, the porous mass C is fed into the tubular member 12 immediately after the impregnating step so that the remaining 60 seconds results in the first standby time in the tubular member 12.

The temperature of the hot air from the hot air generator 14 is set to 150° C. to 250° C., and the actual temperature of the hot air blown into the tubular member 12 is around 130° C. to 140° C. Then the temperature at the outside surface of the porous mass C directly under the inlet aperture 13 rises to maximum of 137° C. The briquette A obtained after the drying step of about 50 minutes has a good hardness and a percentage of moisture content of 1.1% (as determined at the core of the briquette). This value is much lower than 3.0% as standard, indicating that the briquette A has a high quality.

The above composition of the invention increases the efficiency of drying the porous mass and then shortens the drying time, while the constitution is simplified so that the apparatus can be reduced in the installation area as well as in the running cost and the initial cost.

The recyclable material according to the invention includes not only the aforementioned cotton-like agglomerates B, but also shot waste including metallic powder and a large number of shot-peening balls, metallic powder dust occurring in steel-making/smelting processes or the like, and a mixture of the above. In short, at least one type selected from the group consisting of the cotton-like agglomerates, the shot waste and the powder dust may be used as the recyclable material of the invention.

What is claimed is:

1. A manufacture method of briquette for use as metal stock comprising:
    a molding step of forming each of a plurality of porous masses by compression molding a recyclable material containing a powder metal;
    a drying step of feeding the porous masses into a tubular member and blowing hot air into the tubular member thereby drying the porous masses, wherein two immediately adjacent porous masses within the tubular member are in contact with each other during the drying step; and
    an impregnating step of dipping the porous masses in a solidification assistant prior to the drying step, thereby impregnating the solidification assistant into the porous masses, wherein in the impregnating step, each of the porous masses is dipped in the solidification assistant heated to a temperature higher than that of each of the porous masses.

2. The manufacture method of briquette for use as metal stock according to claim 1, wherein in the drying step, the porous masses sequentially fed into the tubular member are dried as transported in an array along a longitudinal direction of the tubular member.

3. The manufacture method of briquette for use as metal stock according to claim 2, wherein an interspace portion extending in the longitudinal direction of the tubular member is defined between an inside surface of the tubular member and outside surfaces of the porous masses fed into the tubular member and arranged in an array, and wherein the porous masses are dried by smoothly passing the hot air through the interspace portion substantially for the overall length of the interspace portion.

4. The manufacture method of briquette for use as metal stock according to claim 1, wherein the drying step includes vertically moving an air-volume controlling member located at a downstream side of the tubular member to control a volume of the hot air passing through a space between the tubular member and an inner circumferential surface of the tubular member and an outer circumferential surface of the porous masses.

5. The manufacture method of briquette for use as metal stock according to claim 1, wherein the porous masses within the tubular member are moved intermittently by a pusher pushing one of the porous masses at a time from outside of the tubular member into the tubular member.

* * * * *